United States Patent [19]

Paar et al.

[11] Patent Number: 4,683,285

[45] Date of Patent: Jul. 28, 1987

[54] PIGMENT GRINDING VEHICLES FOR USE IN WATER-DILUTABLE PAINTS

[75] Inventors: Willibald Paar; Helmut Hönig, both of Graz, Austria

[73] Assignee: Vianova Kunstharz, A.G., Werndorf, Austria

[21] Appl. No.: 790,185

[22] Filed: Oct. 22, 1985

[30] Foreign Application Priority Data

Oct. 22, 1984 [AT] Austria ................. 3358/85

[51] Int. Cl.⁴ .............. C08G 65/26; C08L 63/00; C25D 9/00
[52] U.S. Cl. .................. 528/113; 204/181.7; 523/415; 528/45; 528/69; 528/107
[58] Field of Search .......... 523/415; 528/111, 113, 528/107, 250, 69, 45; 204/181.7

[56] References Cited

U.S. PATENT DOCUMENTS

| | | | |
|---|---|---|---|
| 3,922,253 | 11/1975 | Jerabek | 528/45 |
| 4,031,050 | 6/1977 | Jerabek | 528/45 |
| 4,147,676 | 4/1979 | Pampouchidis | 528/45 |
| 4,174,332 | 11/1979 | Honig et al. | 523/404 |
| 4,327,200 | 4/1982 | Leitner et al. | 528/111 |
| 4,332,711 | 6/1982 | Koo-ymans et al. | 528/111 |
| 4,349,655 | 9/1982 | Leitner et al. | 528/45 |
| 4,366,274 | 12/1982 | Pampouchidis et al. | 528/113 |
| 4,376,844 | 3/1983 | Emmons et al. | 528/111 |
| 4,420,574 | 12/1983 | Moriarity et al. | 523/416 |
| 4,431,781 | 2/1984 | Paar | 528/113 |
| 4,480,083 | 10/1984 | Tortorello et al. | 528/45 |
| 4,485,259 | 11/1984 | Jerabek et al. | 528/111 |
| 4,533,682 | 8/1985 | Tortorello et al. | 528/45 |
| 4,550,146 | 10/1985 | Paar et al. | 528/111 |
| 4,594,403 | 6/1986 | Kempter et al. | 523/416 |
| 4,594,842 | 6/1986 | Chung et al. | 528/111 |

*Primary Examiner*—Veronica P. Hoke
*Attorney, Agent, or Firm*—A. W. Breiner

[57] ABSTRACT

The invention is directed to a process for the production of cationic binders for pigment pastes for water-dilutable paints, particularly for cathodic electrodeposition based on low molecular oxazolidine group carrying modified epoxy compounds, and to the pastes obtained. The process is characterized in that preferably aliphatic di- or polyepoxy compounds are reacted with primary mono- and/or diamines and optionally monocarboxy compounds and that oxazolidine groups are introduced into the molecule by reaction with carbonyl compounds. The products show extremely high pigment loading capacity and an excellent performance in cathodically depositable electrodeposition paints. The products permit formation of low solvent paint systems.

33 Claims, No Drawings

PIGMENT GRINDING VEHICLES FOR USE IN WATER-DILUTABLE PAINTS

FIELD OF INVENTION

The present invention is directed to a process for the production of cationic pigment grinding vehicles for water-dilutable paints, particularly for use in a cathodic electrodeposition (CED) process, based on low molecular weight oxazolidine group-containing modified epoxy compounds, and to the vehicles produced.

BACKGROUND AND PRIOR ART

It is conventional in paint production to grind the pigments to be used in the paints with part of the ultimate binder of the paint system or with special binders referred to at times as paste resins. The so-called milling pastes which result are then combined with the rest of the binder. It is evident that the grinding vehicle preferably is a special resin which has an exceptional pigment-wetting capacity. Furthermore, the grinding vehicle should exhibit good compatibility with the main binder; and it should not, at the required level, substantially detract from the properties of the main binder. Also, the grinding vehicle should have a relatively low viscosity.

In the operation of a CED bath, it has been shown efficient to replenish the bath by adding the bath material as two separate components, that is a high-pigmented color component and a clear varnish component. In this way monitoring of the bath, which can be done at times automatically, is substantially alleviated.

European Patent Application Nos. 0 107 088, 0 107 089, and 0 107 098 disclose synthetic resins which can be used as binders for pigment pastes based on quaternized monoepoxides. These products have the disadvantage in that they reduce the maximum deposition voltage (rupture voltage) of the paint system, that is of the diluted blend of the pigmented component and the clear varnish component, which in turn leads to a reduction of the throwing power, i.e., the coating of shielded parts of the object.

Binders carrying oxazolidine groups are disclosed in EP-B1 00 28 402, EP-A2 00 76 955, and AT-PS 372,689. In many cases the binders disclosed are recommended for the formulation of pigment pastes. However, due to their composition, such products cannot be pigmented in a binder/pigment ratio higher than about 2 parts-by-weight of binder to 3 parts-by-weight of pigment normal for CED coating because this would lead to pigment sediments and agglomerates in the ED bath which normally has a low solids content. In practice, this effect is reflected in a faulty coating, particularly on the horizontal surfaces of the object. The products disclosed in EP B1 00 17 428 have the same deficiency discussed above, and it is impossible to obtain flawless films with highly pigmented pigment pastes.

In order that a product is suitable for use as a pigment paste resin, the product must have a low viscosity and the solubility of the neutralized pigment paste in the bath material must be good in order to achieve a quick homogenization of the paint bath.

THE INVENTION AND GENERAL DESCRIPTION THEREOF

It has now been found that pigment paste binders particularly useful as a two-component bath replenishment in the operation of CED installations can be obtained by modification of low molecular di- or polyepoxy compounds reacted with a primary amine to provide oxazolidine groups.

Thus, the present invention is concerned with a process for producing cationic binders water-soluble upon at least partial neutralization of the basic groups, based on oxazolidine group-containing modified epoxy compounds. The compounds are characterized in that a polyepoxide is reacted with an amine to provide a compound which is then reacted with a carbonyl compound with separation of water and formation of an oxazolidine group.

The polyepoxide compound which is preferably based on diols or polyalkylene glycols or diene polymers or bisphenol A or phenol novolaks, or a mixture of these compounds, is reacted with 0.4 to 1.0 moles, calculated on 1 epoxy val (i.e., epoxy equivalent) of the primary amine groups of aliphatic primary mono- and/or primary-tertiary diamines, and 0 to 0.6 moles of a monocarboxylic compound, the sum of primary amine groups and the optionally used carboxy groups being at least 80% of the epoxy groups in the epoxy compound which are reacted to the complete reaction of the epoxy groups. The carbonyl compound, preferably formaldehyde, is preferably used in equimolar quantities, calculated on the NH-groups, of the polyepoxy compound.

Optionally, the isocyanate reactive H-atoms present on the reaction product of the polyepoxide and carbonyl compound are completely or partly reacted with a monoisocyanate compound which can optionally carry oxazolidine groups. Further, optionally the reaction product of the polyepoxide and carbonyl compound can be reacted with a monoepoxy compound. It is still necessary that the quantity of starting materials are chosen in order that the final product has a molecular weight of from 500 to 4000, preferably from 600 to 2000, an oxazolidine equivalent of from 250 to 1200, an amine value of at least 80 mg KOH/g, preferably of 100 to 200 mg KOH/g, and a proportion of aliphatic molecule segments of at least 30%, preferably 50 to 90%. "Aliphatic molecule segments," as used herein, means carbon chains with four or more carbon atoms and the corresponding oxyalkylene chain.

In a preferred embodiment per epoxy val of the epoxy compound 0.3–0.7 moles of a primary-tertiary diamine and 0–0.7 moles of fatty acids with more than 8 carbon atoms, preferably more than 12 carbon atoms, and/or 0–0.7 moles of primary monoamines with more than 3 carbon atoms, preferably more than 8 carbon atoms, are reacted; and, after formulation of the oxazolidine compound, at least 50% of the free hydroxy groups are reacted with an oxazolidine group containing monoisocyanate.

With this system of construction according to this invention, a large variety of resins can be produced which, by judicious selection of the substituents, can be tailored to the requirements and to the binder of the clear varnish binder, particularly with regard to compatibility characteristics. The reaction mechanism of the preparation is as follows:

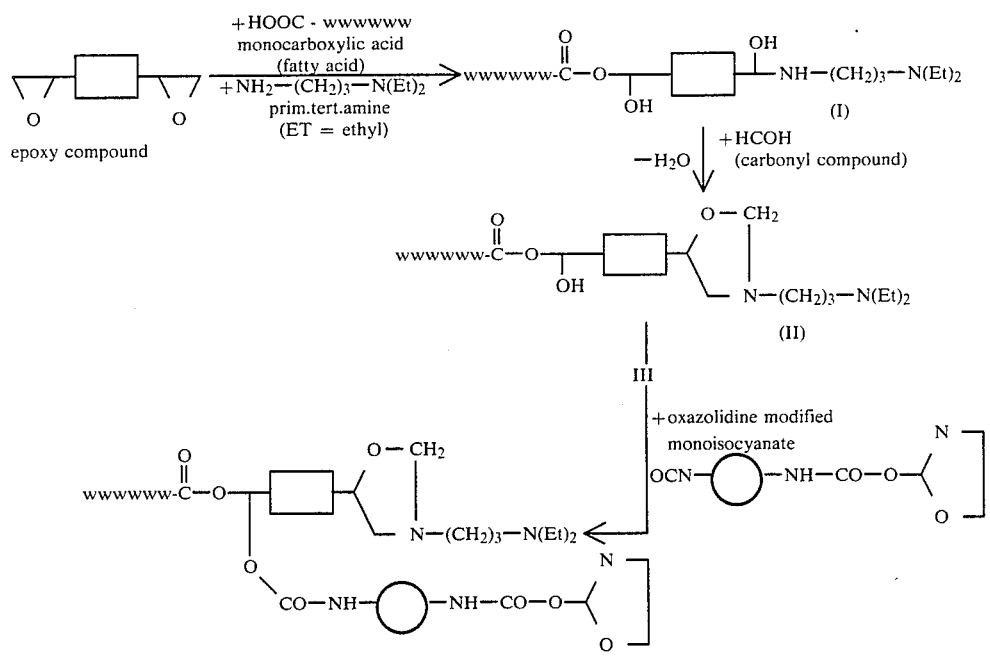

The products produced according to the invention exhibit extremely high pigment loading capacity, particularly if their structure is balanced between hydrophilic and hydrophobic character. Products containing long chain monocarboxylic acids or fatty amines as the modifying compound give pigment pastes which can be pigment-loaded in a binder/pigment ratio of 1 part-by-weight of binder and up to 15 parts-by-weight of pigment. The proportion of paste resin of total paint binder can, thus, be reduced to below 5%.

Since the products show excellent voltage resistance on electrodeposition, also with the formation of thicker coatings, the whole binder system, even with the higher proportions, is unlikely to fall off in the various properties such as throwing power and corrosion resistance. In general, the products have a very low viscosity, and thus they act as an auxiliary solvent. This fact essentially simplifies the preparation of low solvent paints or, in many cases, allows for production in a satisfactory manner. A further advantage of the products prepared according to the invention is the better utilization of the equipment when preparing the pigment pastes.

Suitable di- or polyepoxy compounds with a molecular weight having a maximum of 2000 are the diglycidylethers of diols, particularly of (poly)oxyalkylene diols with epoxy equivalent weights of between 150 and 350. Particularly preferred compounds are the diglycidyl ethers of polypropylene glycol. Additionally, the epoxidized dienes, such as the commercially available epoxidized polybutadiene oils with epoxy equivalent weights of 100 to 600, preferably of 200 to 500, or the low molecular weight diglycidyl ethers of bisphenol A with epoxy equivalent weights of about 200, or the corresponding polyglycidyl ethers of phenol novolaks or mixtures of the listed products, can be utilized.

Suitable aliphatic primary amines are primary alkyl amines with four or more carbon atoms, particularly the so-called fatty amines, or primary alkylamino group-containing compounds such as the N-aminoethylpiperazine.

The preferred primary-tertiary diamines are the N,N-dialkylaminoalkylamine such as dimethylaminoethylamine, diethylaminopropylamine, or dimethylaminoneopentaneamine (N,N,2,2-tetramethylpropane-1,3-diamine).

Suitable monocarboxy compounds are, depending on the desired degree of hydrophobicity, monocarboxylic acids with more than eight carbon atoms and particularly fatty acids with more than 12 carbon atoms. Among the suitable compounds are the fatty acids of the natural oils and their transformation products, as well as tall oil fatty acids or synthetic fatty acids. Furthermore, semiesters of dicarboxylic acid anhydrides with monoalcohols or N-hydroxyalkyloxazolidines such as those described in EP-B1 00 28 402 can be used to advantage as the monocarboxy compound.

When monocarboxy compounds are used, they are reacted in a first step at about 70° to 120° C., with the epoxy compound to an acid value of below 3 mg KOH/g. The reaction of the epoxy compound with the amines is carried out at about 70° to 80° C. until all epoxy groups have reacted as illustrated in Formula (I) of the reaction scheme, supra.

The oxazolidine group forms through ring formation over the formed secondary amino group and the neighboring secondary hydroxy group through reaction with a carbonyl compound. The preferred carbonyl compound is formaldehyde. Other aliphatic or aromatic aldehydes such as butanal or benzaldehyde or ketones, such as methylisobutylketone, can be used as illustrated in Formula (II) of the reaction scheme, supra. The reaction is carried out at about 80° to 120° C., the reaction water forming being distilled off by azeotropic distillation with the aid of an entraining agent such as an aliphatic hydrocarbon or toluol. The reaction is completed when the calculated quantity of water has been entrained.

Particularly good properties are realized when the hydroxy and amino groups are reacted completely, including in part with modifying compounds. Such a modification is, for example, with the total or partial reaction of free secondary hydroxy groups with monoisocyanate compounds. As the monoisocyanates, the commercially available products can be used. For the specific use of the products of the invention as pigment grinding vehicles, the preferred monoisocyanates are those obtained by reaction of equimolar quantities of diisocyanates with N-hydroxyalkyl oxazolidines as described in AT-PS 366,401 or AT-PS 374,816. The reaction is carried out at about 50° to 80° C. to an isocyanate value of practically zero. In an alternate embodiment, modification can be effected through joint reaction of the modified epoxy compound with an N-hydroxyalkyl oxazolidine at about 30° to 50° C. Secondary amino groups which may be present, for example from the N-aminoethylpiperazine, can be used as reaction partners for modification with the above-mentioned monoisocyanates or monoepoxy compounds.

The components are used according to this invention in a weight to yield the following characteristic ranges for the products produced according to the invention:

| | |
|---|---|
| Molecular weight | 500–4000, preferably 600–2000 |
| Oxazolidine equivalent (= molecular weight per oxazolidine group) | 250–1200 |
| Amine value | min. 80 mg KOH/g, preferably 100–200 mg KOH/g |
| Aliphatic molecule segments | min 30%, preferably 50–90% of the total molecules. |

As above stated, for each epoxy val of the epoxy compound, 0.4 to 1.0 moles of primary amino group and zero to 0.6 moles of carboxy groups are used, the sum of the primary amino groups and the optionally used carboxy groups amounting to at least 80% of the epoxy groups.

The products produced according to the invention are processed in known manner with pigments, extenders, dyestuffs, and optionally with paint additives. For the preparation of the pigment pastes, normal milling equipment such as dissolvers, sand mills, pearl mills, or ball mills, or roll mills are used. The pigmented pastes are blended with a clear varnish to provide a paint with the desired pigment/binder ratio. The pigment pastes produced from the grinding vehicles prepared according to the invention, due to their high pigment loading capacity, are ideally suited for a two-component replenishment in the operation of CED baths and for the formulation of paints with low proportions of organic auxiliary solvents.

The evaluation of the grinding vehicles for pigments and of the pigment pastes prepared therefrom is made by determination of an eventual sieve residue per volume unit with a mesh size of 20–30 μm. For electrodeposition paints the so-called "L-panel test," i.e., the coating of an L-shaped panel and the evaluation of the horizontal surfaces, is a criterion for the settling behavior of the paint and the pigment wetting capacity.

EXAMPLES OF PRESENTLY PREFERRED EMBODIMENTS

The following examples illustrate the invention without limiting its scope. Quantities and percentages are by weight if not otherwise stated. The following abbreviations are used in the examples:

DMAPA: N,N-Dimethylaminopropylamine
DEAPA: N,N-diethylaminopropylamine
PF 91: Paraformaldehyde, 91%
CE: Technical blend of glycidyl esters of 1,1-dimethyl-($C_7$-$C_9$) carboxylic acids
TDI: Toluylenediisocyanate (commercially available isomer blend)
THMDI: Trimethylhexamethylenediisocyanate
PSA: Phthalic acid anhydride
EGL: Ethyleneglycolmonoethylether
BUGL: Ethyleneglycolmonobutylether
PME: Propyleneglycolmonomethylether
DMDE: Diethyleneglycoldimethylether

EXAMPLE 1

In a reaction vessel equipped with stirrer, thermometer, addition funnel, water separator and reflux condensor, 440 parts of an epoxidized polybutadiene oil having a molecular weight of approximately 1400, and an epoxy equivalent of approximately 440, are reacted with 92 parts DMAPA (0.9 moles in the presence of 0.5 parts 2,6-di-tert.-butyl-4-methylphenol as an inhibitor at from about 160° to about 200° C. until all epoxy groups have reacted. After cooling to 80° C., 30 parts PF 91 (0.9 moles) are added and 18 parts reaction water are entrained azeotropically with a benzine solvent having a boiling range of from about 80°–120° C. After vacuum stripping the solvent, the batch is diluted with 59 parts BUGL. The resin has the following characteristics:

| | |
|---|---|
| Viscosity | 2600 mPa.s/25° C. |
| Oxazolidine equivalent (calculated) | 604 |
| Amine value | 185 mg KOH/g |
| Aliphatic content | 80% |
| Molecular weight (calculated) | 1632 |
| Solubility[1] | 25 mmoles formic acid per 100 g resin solids |

[1]The quantity of acid necessary for the preparation of a stable aqueous dispersion (mmoles = millimoles).

EXAMPLE 2

In the apparatus described in Example 1, 320 parts of an epoxy resin based on polypropylene glycol having an equivalent weight of approximately 320 are reacted at 75° to 80° C. with 134 parts tallow fatty amine and 52 parts DEAPA to an epoxy value of zero. After addition of 30 parts PF 91, 19 parts reaction water are entrained azeotropically with a benzine solvent having a boiling range of from about 80° to 120° C. The entraining agent is vacuum-stripped. The resin has the following characteristics:

| | |
|---|---|
| Viscosity | 1500 mPa.s/25° C. |
| Oxazolidine equivalent (calculated) | 574 |
| Amine value | 141 mg KOH/g |
| Aliphatic content | 80% |
| Molecular weight (calculated) | 1034 |
| Solubility | soluble without acid neutralizing agent |

EXAMPLE 3

With an apparatus and process analogous to Example 1, 380 parts of an epoxy resin based on bisphenol A having an epoxy equivalent of approximately 190 are reacted with 268 parts tallow fatty amine and 104 parts DEAPA at 75° to 80° C. to an epoxy value of zero.

After addition of 60 parts PF 91 using toluol as an entraining agent 38 parts reaction water are distilled. After vacuum-stripping the solvent, the batch is diluted with 90 parts PME. The resin has the following characteristics:

| Viscosity | 7000 mPa.s/25° C. |
|---|---|
| Oxazolidine equivalent (calculated) | 430 |
| Amine value | 188 mg KOH/g |
| Aliphatic content | 33% |
| Molecular weight (calculated) | 774 |
| Solubility | 30 mmoles formic acid per 100 g resin solids |

EXAMPLE 4

In the apparatus described in Example 1, 320 parts of an epoxy resin based on polypropyleneglycol having an epoxy equivalent of about 320 are esterified at 120° C. with 140 parts linseed oil fatty acid in the presence of 0.5 parts triethylamine as catalyst to an acid value of below 3 mg KOH/g. After cooling to 80° C., 52 parts N-aminoethylpiperazine are added and reacted at 80° C. to an epoxy value of zero. Thereafter, 14 parts PF 91 are added and 9 parts water are entrained azeotropically using a benzine solvent have a boiling range of from about 80° to 120° C. The entraining agent is removed and the batch is reacted at 120° C. with 100 parts CE to an epoxy value of zero. In a separate reaction vessel a monoisocyanate carrying oxazolidine groups is prepared by the following process.

70 parts TDI are dissolved in 85 parts DMDE and, at 25° to 30° C., 129 parts of an oxazolidine prepared from 24 parts monoethanolamine, 100 parts CE, and 13 parts PF 91 are added in portions and reacted to an isocyanate value corresponding to one isocyanate group. The monoisocyanate is added to the resin prepared according to this Example 4 in portions at 50° to 60° C., and the batch is reacted to an isocyanate value of zero. The batch is diluted with 95 parts DMDE and has the following characteristics:

| Viscosity | 16,000 mPa.s/25° C. |
|---|---|
| Oxazolidine equivalent (calculated) | 1019 |
| Amine value | 110 mg KOH/g |
| Aliphatic content | 57% |
| Molecular weight (calculated) | 1632 |
| Solubility | 10 mmoles formic acid per 100 g resin solids |

EXAMPLE 5

In a suitable reaction vessel, 74 parts PSA are reacted with 162 parts of the oxazolidine prepared as described in Example 4 from the monoethanolamine, CE, and PF 91 at 75° to 80° C. to an acid value of about 120 mg KOH/g.

320 parts of an epoxy resin based on propyleneglycol having an epoxy equivalent of approximately 320 are added and the blend is esterified at 120° C. to an acid value of below 3 mg KOH/g. After cooling to 70° C., 52 parts DEAPA are added and the temperature is held until an epoxy value of zero is reached. After addition of 13 parts PF 91, 8 parts water are entrained azeotropically with a benzine solvent having a boiling range of about 80° to 120° C. Then the batch is mixed with 125 parts of the oxazolidine prepared from the monoethanolamine, CE, and PF 91 as described in Example 4, and cooled to 30° to 35° C. Thereafter, 84 parts THMDI are added in portions and reacted at 50° C. until all isocyanate groups have reacted. After stripping the entraining agent, the batch is dissolved with 200 parts BUGL. The following characteristics were obtained:

| Viscosity | 21,000 mPa.s/25° C. |
|---|---|
| Oxazolidine equivalent (calculated) | 624 |
| Amine value | 116 mg KOH/g |
| Aliphatic content | 59% |
| Molecular weight (calculated) | 1650 |
| Solubility | 15 mmoles formic acid per 100 g resin solids |

EVALUATION OF THE BINDERS PREPARED ACCORDING TO THE INVENTION AS PIGMENT PASTE RESINS

Pigment pastes are prepared from the binders of Examples 1 and 5 as standard test formulations according to the following formulas with binder/pigment ratios of 1:6, 1:12, and 1:15. Two hours after the preparation of the pastes was completed, their viscosity (efflux time, DIN 23 211/23° C.) was recorded. The pastes were added to diluted, clear varnishes of various CED binders as 11% aqueous solutions; and after 24 hours, 2 weeks, and 4 weeks with stirring at room temperature, the sieve residue was determined and L-shaped panels were coated. The CED binders were of various types such as are used in practice. For comparison, the pigment paste resins as conventionally used in practice were tested.

FORMULATION AND PREPARATION OF THE PIGMENT PASTES

A 15% solution was prepared from 100 parts resin solids, 5 parts wetting agent, based on an acetylene alcohol, calculated as solids and used as a 25% solution in EGL, 24 parts lactic acid (5-N), and deionized water and was ground on a laboratory pearl mill with the pigment compositions according to Table 1.

TABLE 1

| | Pigment Composition of Pigment Pastes A–F | | | | |
|---|---|---|---|---|---|
| | Pigment Composition | | | | B/P |
| Paste | Carbon Black | Aluminum Silicate Pigment | Titanium Dioxide | Basic Lead Silicate | Ratio in the Paste |
| A | 54 | 456 | — | 90 | 1:6 |
| B | 24 | — | 1104 | 72 | 1:12 |
| C | 30 | — | 1380 | 90 | 1:15 |
| D | 9 | 76 | — | 15 | 1:1 |
| E | 18 | 152 | — | 30 | 1:2 |
| F | 6 | — | 278 | 18 | 1:3 |

For comparison, pigment paste resins were used which are described in EP-B1-00 28 402 (comparison binder X) and EP-A2-00 76 955 (comparison binder Y).

In preparing electrodeposition paints, the pigment pastes were added with stirring to aqueous clear varnishes with a solids content of 11%, the weight ratios being chosen so as to obtain the desired binder/pigment ratio. The binders for the clear varnish were Resin L: A resin curing through thermal polymerization, according to U.S. Pat. No. 4,174,332;

Resin M: A resin curing through trans-esterification, according to EP 00 12 463; and Resin N: A resin curing through trans-urethanization, according to DE-PS 22 52 536.

For testing, the paints were diluted to 16% with deionized water.

TEST METHODS UTILIZED

Sieve Residue: 1 liter of the diluted paint solution is poured through a weighed perlon sieve (mesh size 28 $\mu$m). The sieve is rinsed with deionized water, dried for one hour at 110° C., and weighed. The weigh-out is recorded in mg.

L-panel Deposition: A zinc-phosphated steel panel (approximately 10×20 cm) is bent in the middle at a right angle. The panel is positioned in the paint bath in order that the horizontal side is about 15 cm below the paint surface. The panel is coated for 4 minutes without stirring the bath. The coated panel is left in the bath for two additional minutes, taken out, rinsed for two minutes with water, and stoved. Leveling, gloss, and sediments are checked visually.

The composition of the test paints and the results are tabulated in Table 2. The abbreviations in Table 2 have the following meaning:

i.O.: in order, no sediments
LM: slightly mat
M: mat film, leveling in order
S: sediments
n.i.O.: film unusable
XX: cannot be measured (sieve stopped up)
NM: cannot be measured (viscosity too high)
B/P Verh: binder/pigment ratio

TABLE 2

Evaluation of Paste Resins According to Examples 1–5 and Comparison Examples

| | ED-Paint Composition | | | | | | Test Results | | | | | |
|---|---|---|---|---|---|---|---|---|---|---|---|---|
| | | Pigment paste | | | | | Sieve residue | | | "L-Panel" | | |
| Test Combination | Clear Paint Binder | Paste Resin | Pigment Composition | Viscosity of Paste, Sec. | B/P Verh. Paste | B/P Verh. ED-Paint | After 24 Hours | After 2 Weeks | After 4 Weeks | After 24 Hours | After 2 Weeks | After 4 Weeks |
| 1 | L | 1 | A | 50 | 1:6 | 1:0.2 | 5 | 7 | 7 | i.O. | i.O. | i.O |
| 2 | L | 1 | B | 43 | 1:12 | 1:0.5 | 2 | >2 | >2 | i.O. | i.O. | i.O. |
| 3 | L | 1 | C | 55 | 1:15 | 1:0.5 | 12 | 15 | 15 | LM | M | M |
| 4 | M | 1 | B | 43 | 1:12 | 1:0.5 | 3 | 2 | 3 | i.O. | i.O. | i.O. |
| 5 | M | 1 | C | 55 | 1:15 | 1:0.5 | 5 | 8 | 8 | i.O. | i.O | i.O. |
| 6 | N | 1 | A | 50 | 1:6 | 1:0.2 | 7 | 7 | 10 | i.O. | i.O. | i.O. |
| 7 | N | 1 | C | 50 | 1:15 | 1:0.5 | 12 | 12 | 10 | LM | LM | LM |
| 8 | L | 2 | B | 48 | 1:12 | 1:0.5 | 7 | 5 | 5 | i.O. | i.O. | i.O. |
| 9 | L | 2 | C | 60 | 1:15 | 1:0.5 | 8 | 8 | 10 | i.O. | i.O. | i.O. |
| 10 | M | 2 | C | 60 | 1:15 | 1:0.5 | 6 | 6 | 6 | i.O. | i.O. | i.O. |
| 11 | L | 3 | A | 62 | 1:6 | 1:0.2 | 16 | 16 | 20 | LM | LM | M |
| 12 | N | 3 | B | 65 | 1:12 | 1:0.5 | 10 | 10 | 12 | i.O. | i.O. | LM |
| 13 | L | 4 | B | 60 | 1:12 | 1:0.5 | 3 | 3 | >3 | i.O. | i.O. | i.O. |
| 14 | L | 4 | C | 64 | 1:15 | 1:0.5 | 5 | 7 | 7 | i.o. | i.o. | i.o |
| 15 | L | 5 | B | 56 | 1:12 | 1:0.5 | 4 | 4 | 5 | i.O. | i.O. | i.O. |
| 16 | M | 5 | C | 62 | 1:15 | 1:0.5 | 6 | 5 | 5 | i.O. | i.O. | i.O. |
| V1 | L | X | A | 120 | 1:6 | 1:0.2 | 80 | XX | XX | n.i.O. | — | — |
| V2 | L | X | B | NM | 1:12 | 1:0.5 | 200 | XX | XX | n.i.O. | — | — |
| V3 | L | Y | A | 105 | 1:6 | 1:0.2 | 35 | 80 | XX | M,S | n.i.O. | — |
| V4 | L | Y | B | NM | 1:12 | 1:0.5 | 100 | XX | XX | n.i.O. | — | — |
| V5 | L | X | D | 60 | 1:1 | 1:0.2 | 15 | 20 | 20 | LM | LM | LM |
| V6 | L | Y | D | 62 | 1:1 | 1:0.5 | 5 | 7 | 7 | i.O. | i.O. | i.O. |
| V7 | L | Y | E | 100 | 1:2 | 1:0.5 | 7 | 7 | 7 | i.O. | i.O. | i.O. |
| V8 | L | X | E | T | 1:2 | 1:0.2 | 80 | XX | XX | n.i.O. | — | — |
| V9 | L | Y | F | 100 | 1:3 | 1:0.5 | 20 | 20 | 18 | M | M | M |

As will be apparent to one skilled in the art, various modifications can be made within the scope of the aforesaid description. Such modifications being within the ability of one skilled in the art form a part of the present invention and are embraced by the appended claims.

It is claimed:

1. Cationic binders water-soluble upon at least partial neutralization of basic groups contained therein comprising the reaction product of components (A) and (B), said component (A) being free of epoxide groups and prepared from a polyepoxide having a maximum molecular weight of 2000 and an amine containing a primary alkylamino group, said amine being present in an amount to provide from about 0.4 to 1.0 moles of primary amine groups for each mole of epoxide groups in said polyepoxide, and said component (B) being a carbonyl compound which is a member of the group consisting of aliphatic and aromatic aldehydes or ketones; said reaction product containing an oxazolidine ring formed through reaction of component (B) with component (A) and having a molecular weight of from about 500 to 4000, an oxazolidine equivalent of from about 250 to 1200, an amine value of at least 80 mg KOH/g and a proportion of aliphatic molecule segments of at least 30%.

2. The cationic binders of claim 1 wherein said component (A) includes up to 0.6 moles of monocarboxylic acid and the total of primary amino groups and monocarboxylic groups are equivalent to at least 80% of the epoxide groups in said polyepoxide.

3. The binder of claim 1 wherein said polyepoxide is based on a member of the group consisting of a diol, a polyalkylene glycol, a diene polymer, 4,4'-diphenylolpropane and a phenol novolak.

4. The binder of claim 1 wherein said amine containing a primary alkylamino group is a member of the group consisting of a primary alkylmonoamine with 4 or more carbon atoms, a primary-tertiary diamine and a piperazine substituted primary alkylamine.

5. The binder of claim 4 wherein said amine is a fatty amine with more than 8 carbon atoms.

6. The binder of claim 2 wherein said monocarboxylic compound has more than 8 carbon atoms.

7. The binder of claim 6 wherein said monocarboxylic compound is a fatty acid with more than 12 carbon atoms.

8. The binder of claim 1 wherein the carbonyl compound is reacted in equimolar quantities with the NH-groups of the epoxide amine compound.

9. The binder of claim 1 wherein said carbonyl compound is formaldehyde.

10. The binder of claim 1 wherein the hydroxy or amine groups of the reaction product after oxazolidine ring formation are completely or partly reacted with a member of the group consisting of a monoisocyanate compound and a monoepoxide compound.

11. The binder of claim 10 wherein at least 50% of the free hydroxy or amine groups of the reaction product after oxazolidine ring formation are reacted with an oxazolidine group containing monoisocyanate.

12. The binder of claim 1 wherein the reaction product has a molecular weight of from 600 to 2000, an amine value of from 100 to 200 mg KOH/g, and the aliphatic molecule segments are between 50 and 90%.

13. The binder of claim 2 wherein each mole of epoxide groups is reacted with 0.3 to 0.7 moles of a primary-tertiary diamine, 0 to 0.6 moles of fatty acid having more than 8 carbon atoms or 0 to 0.7 moles of a primary monoamine having more than 3 carbon atoms and after oxazolidine ring formation 50% of the free hydroxy groups are reacted with an oxazolidine group containing monoisocyanate.

14. A pigment paste comprising as a grinding vehicle the binder of claim 1.

15. The pigment paste of claim 14 wherein the binder to pigment ratio is from about 1:5 to 1:15.

16. Cathodically depositable electrodeposition paint comprising the pigment paste of claim 14.

17. Cathodically depositable electrodeposition paint comprising the pigment paste of claim 15.

18. A method of replenishing cathodically depositable paint material in a two-component replenishing process wherein the pigment component is the pigment paste of claim 14.

19. A method of replenishing cathodically depositable paint material in a two-component replenishing process wherein the pigment component is the pigment paste of claim 15.

20. A process for producing cationic binders which are water-soluble upon at least partial neutralization of basic groups contained therein comprising the steps of (1) reacting a polyepoxide having a maximum molecular weight of 2000 with an amine containing a primary alkylamino group, said amine being present in an amount to provide about 0.4 to 1.0 moles of primary amine groups for each mole of epoxide groups in said polyepoxide to provide component (A) which is substantially free of epoxide groups; and (2) reacting said component (A) which is free of epoxide groups with component (B) which is a carbonyl compound selected from the group consisting of aliphatic and aromatic aldehydes or ketones through oxazolidine ring formation; said reactions being carried out in order that the reaction product of components (A) and (B) have a molecular weight of from about 500 to 4000, an oxazolidine equivalent of from about 250 to 1200, an amine value of at least 80 mg KOH/g and a proportion of aliphatic molecule segments of at least 30%.

21. The process of claim 20 wherein in providing said component (A) up to 0.6 moles of a monocarboxylic acid are included in the reaction and wherein the total of primary amino groups and monocarboxylic groups are equivalent to at least 80% of the epoxide groups in said polyepoxide.

22. The process of claim 21 wherein said polyepoxide is based on a member of the group consisting of a diol, a polyalkylene glycol, a diene polymer, 4,4'-diphenylolpropane and a phenol novolak.

23. The process of claim 20 wherein said amine containing a primary alkylamino group is a member of the group consisting of a primary alkylmonoamine with 4 or more carbon atoms, a primary-tertiary diamine, and a piperazine substituted primary alkylamine.

24. The process of claim 23 wherein said amine is a fatty amine with more than 8 carbon atoms.

25. The process of claim 21 wherein said monocarboxylic compound has more than 8 carbon atoms.

26. The process of claim 25 wherein said monocarboxylic compound is a fatty acid with more than 12 carbon atoms.

27. The process of claim 20 wherein the carbonyl compound is reacted in equimolar quantities with the NH-groups of the epoxide amine compound.

28. The process of claim 20 wherein said carbonyl compound is formaldehyde.

29. The process of claim 20 wherein the hydroxy or amine groups of the reaction product after oxazolidine ring formation are completely or partly reacted with a monoisocyanate compound or a monoepoxide compound.

30. The process of claim 29 wherein at least 50% of the free hydroxy or amine groups of the reaction product after oxazolidine ring formation are reacted with an oxazolidine group containing monoisocyanate.

31. The process of claim 30 wherein the modification with the oxazolidine monoisocyanate is made by reacting the reaction product carrying oxazolidine groups simultaneously with a hydroxyalkyl oxazolidine and equimolar amounts of a diisocyanate.

32. The process of claim 20 wherein the reaction product has a molecular weight of from 600 to 2000, an amine value of from 100 to 200 mg KOH/g, and the aliphatic molecule segments are between 50 and 90%.

33. The process of calim 20 wherein each mole of epoxide groups are reacted with 0.3 to 0.7 moles of a primary-tertiary diamine, 0 to 0.6 moles of fatty acid having more than 8 carbon atoms or 0 to 0.7 moles of a primary monoamine having more than 3 carbon atoms and reacting after oxazolidine ring formation 50% of the free hydroxy groups with an oxazolidine group containing monoisocyanate.

* * * * *